US007653532B2

(12) United States Patent
Nakano

(10) Patent No.: US 7,653,532 B2
(45) Date of Patent: Jan. 26, 2010

(54) CONTENT RECORDING/REPRODUCING APPARATUS, STORAGE MEDIUM AND COMPUTER PROGRAM

(75) Inventor: Takehiko Nakano, Kanagawa (JP)

(73) Assignee: Sony Corporation, Tokyo (JP)

( * ) Notice: Subject to any disclaimer, the term of this patent is extended or adjusted under 35 U.S.C. 154(b) by 1832 days.

(21) Appl. No.: 10/350,996

(22) Filed: Jan. 24, 2003

(65) Prior Publication Data
US 2003/0158741 A1 Aug. 21, 2003

(30) Foreign Application Priority Data
Jan. 25, 2002 (JP) ............................. 2002-017602

(51) Int. Cl.
*G10L 19/00* (2006.01)
(52) U.S. Cl. .................. 704/201; 704/270; 705/51; 705/52; 705/57
(58) Field of Classification Search ................. 704/270, 704/276, 270.1, 272, 201; 386/116, 68; 705/51, 705/52, 53, 57, 59
See application file for complete search history.

(56) References Cited
U.S. PATENT DOCUMENTS
6,157,769 A * 12/2000 Yoshimura et al. ............ 386/68

6,308,007 B1 * 10/2001 Iwasaki ...................... 386/116
6,907,407 B1 * 6/2005 Yamanoue et al. ............ 705/57

FOREIGN PATENT DOCUMENTS
JP 11-025110 1/1999
JP 11-098441 4/1999
JP 2000-242699 9/2000

OTHER PUBLICATIONS
"A Line-Up of New Devices for Recording TV Programs in HDDs", Nikkei Electronics, No. 727, pp. 27-28, 1998.
"Digital Technology Using HDDs Finally Available for Home Users", Nikkei Electronics, No. 727, pp. 41-46, 1998.

* cited by examiner

*Primary Examiner*—Huyen X. Vo
(74) *Attorney, Agent, or Firm*—Finnegan, Henderson, Farabow, Garrett and Dunner, L.L.P.

(57) ABSTRACT

If there is a limitation imposed to the time period within which recording of certain content such as broadcast content is permitted, with the purpose of protection of copyrights of such content, a relationship between the accessible time and a current time is indicated so that a user can be informed of the remaining time before the deadline or the elapsed time since the deadline. In this way, the user can verify how a system is currently working to manage recording operation regarding the information having restricted or limited accessible time. In addition, automatic reproduction of digital material performed immediately before the deadline can help the user to avoid careless failure to access the provided content.

21 Claims, 10 Drawing Sheets

CONTENT RECORDING/REPRODUCING APPARATUS, STORAGE MEDIUM AND COMPUTER PROGRAM

CROSS REFERENCE TO RELATED APPLICATIONS

This application claims priority to Japanese Patent Application No. JP 2001-017602, filed on Jan. 25, 2002, the disclosure of such application being herein incorporated by reference to the extent permitted by law.

BACKGROUND OF THE INVENTION

1. Field of the Invention

The present invention relates to a content recording/reproducing apparatus, method, storage medium and computer program, and particularly to a content recording/reproducing apparatus, method, storage medium and computer program in which end users can record/reproduce content distributed via broadcast and the like.

More specifically, the invention is directed to a content recording/reproducing apparatus, method, storage medium and computer program for recording/reproducing content for which a record holding period or a reproducible period is restricted for protection of copyrights, etc., and particularly to a content recording/reproducing apparatus, method, storage medium and computer program which allow users to easily understand a mechanism of time limit for content access.

2. Description of Related Art

Progress in digital technology has made it possible to store a massive volume of audio/video data. Hard disk drives (HDD) having a storage capacity of, for example, several tens of gigabytes or even more are now available relatively inexpensively, and so are HDD-based recording apparatuses (for example, with reference to "A Line-Up of New Devices for Recording TV Programs in HDDs", in "Nikkei Electronics", No. 727, pp.27-28, 1998), "Digital Technology using HDDs Finally Available for Home Users", in "Nikkei Electronics", No. 727, pp.41-46, 1998) and the like).

In the United States for example, devices are marketed which allow a user to record received broadcast content in a large-capacity storage medium such as a hard disk so that the user can access the recorded content in some later time in the event that he or she were interrupted by a telephone call or an unexpected guest during watching, for example.

However, recording of digital material including broadcast content by end users, if left unrestricted, would be a threat to copyrights holders such as broadcasting companies as their rights are likely to be infringed, particularly in view of the fact that digital material is extremely vulnerable to copying and tampering. Thus, it would be preferable to impose some restriction on the access to content when and after the content is recorded and reproduced through a content recording/reproducing apparatus.

For example, a time limit may be imposed for the content so that a user can hold the content recorded or access the content within that time limit, whereby unauthorized access to the content can be prevented. In one specific example, a user can access content only within one hour after the content is broadcasted, i.e., the content becomes overdue in one hour, after which the user can no longer reproduce it. In one implementation, the content recording/reproducing apparatus does not hold any content for which a predetermined time has elapsed from a broadcasting time or a receiving time (i.e., the apparatus deletes the content from the hard disk), or does not reproduce any content to which accessible time has expired (i.e., the apparatus does not read the content from the hard disk).

Thus, a system for managing use of content in terms of a record holding period or a reproducible period may be technically effective in restricting unauthorized access to the content. However, a key to efficient running of this system would require that the system be intelligible to all users or that the users learn on how long they still can play their recorded content. Otherwise, when they are back from what have interrupted them and are now ready to reproduce the content, they would doubt whether anything is wrong with the apparatus as the apparatus does not accept their command or would feel distressed about what goes on with their recorded content.

SUMMARY OF THE INVENTION

In order to solve the above problems, the present invention provides a convenient content recording/reproducing apparatus, storage medium and computer program which are capable of properly recording/reproducing content for which a record holding period or a reproducible period is limited for copyrights protection, etc.

In addition, in order to solve the above problems mentioned above, the present invention also provides a content recording/reproducing apparatus, storage medium and software program, which allow a user to easily understand how a system for accessing content is managed in terms of its limited or restricted record holding period or reproducible period.

The present invention has been conceived in view of the above-mentioned problems and a first preferred embodiment of the present invention provides an apparatus for controlling recording and reproducing of content for which a accessible period is restricted, the apparatus including: content recording means for recording the content received from an external source; determining means for determining the accessible time period to the recorded content; indication means for indicating information about the accessible time period to the recorded content; content reproducing means for reproducing the recorded content; and reproduction control means for controlling reproducing operation performed by the content reproducing means according to the accessible period for the recorded content.

For any content distributed via, for example, broadcasting or communication, it is preferable to set a accessible period during which reproduction of received/recorded content is limited in order to protect rights including copyrights. Therefore, the reproduction control means prohibits the content reproducing means from reproducing any content to which accessible time has expired, for protection of the content from unauthorized use or access.

Also, the apparatus according to the first preferred embodiment of the invention may indicate the information about the accessible period to the recorded content.

Therefore, based on the information indicated by the indication means, a user, i.e., a viewer or hearer or listener of the content can acknowledge how much time remains before the accessible period for the content expires or how much time has elapsed after the accessible period has expired, and also can easily check how a system is keeping track of his or her recording of information whose usable (accessible) time is limited. In addition, the viewer or hearer would neither doubt that something is wrong with the apparatus nor would he or she feel distressed about what is going on with the recorded content.

The accessible period herein used can be determined for content based on a record holding period uniquely given to each subdivision of content, and is, for example, a remaining time before the relevant record holding period runs out. The remaining time may be managed in terms of an absolute time limit using a time/date and a calendar clock, or in terms of a relative time limit using, as a reference, a timing at which content is recorded or a timing at which content is reproduced for the first time, for example.

Each of a subdivision (or partition of unit) of content is given a record holding period unique to itself. Content distributors may give each of such subdivision of their content a record holding period specified according to its commercial or cultural value.

The accessible time (period) to the content may be determined based on a record holding period given to said content and starting when distribution of said content is initiated or when reception or recording of said content is initiated. In such implementation, a distributor of content may set a time limit within which the content is usable, i.e., accessible with a time in which the content was distributed or delivered may be used as a reference.

In another implementation, the accessible time (period) to the content can be determined based on a time within such recording holding period given to the content, starting when the content is reproduced by the content reproducing means for a first time. In this implementation, unless starting reproduction of the content, the viewer or hearer can keep the record holding period given to the content by the content distributor unused, and thus may access the recorded content at any desired time. That is, unless deactivating or releasing a pause function, the viewer or hearer can keep the content accessible.

The indication means may indicate the information about the accessible period for the recorded content by superposing with a reproduced signal of the content. Thus, the viewer or hearer of the content may verify the remaining time over the screen where the content is being reproduced.

Alternatively, the indication means may indicate the information about the accessible period for the recorded content via an output apparatus other than the channel that outputs the reproduced content.

Still alternatively, the indication means may send the information about the accessible period for the recorded content to a communication path such as a network, to give notice about the remaining time to an external equipment or apparatus.

Moreover, the apparatus according to the first preferred embodiment of the invention may further include control input means for receiving a command from a user. The control input means may be, for example, a control panel and a remote controller through which the user can give commands for selecting a desired channel for content, temporarily stopping accessing, i.e., activating a pause mode (to be hereinafter referred to simply as "pause"), forwarding, "rewinding", etc.

In response to a command for shifting an access start position for the content via the control input means, the reproduction control means may instruct the content reproducing means to shift a reproducing position for the content, and the indication means may indicate the information about the accessible period for the reproduced content. In this way, the user, i.e., the viewer or hearer of the content can acknowledge how much time still remains before the accessible period for the content expires or how much time has elapsed after the accessible period has expired, and also can easily check how the system is currently working for his or her recording of information having accessible time restricted.

Alternatively, in response to a command for deactivating the pause function input via the control input means, the indication means may indicate the information about the accessible period for the content, and the reproduction control means may instruct the content reproducing means to start reproducing the content unless the content is expired.

Since the reproduction control means prohibits the content reproducing means from reproducing any content to which accessible time has expired for protection of certain rights over the content such as copyrights, the user can no longer access the content having access time overdue or expired. Thus, for the content to which accessible time has expired, there is no need to keep the content under pause.

Hence, upon expiration of the accessible period for the content under pause, the reproduction control means may automatically start reproducing the content under pause independently of a user having given a command for resuming accessing of the content under pause, so that the user may not fail to access the content carelessly. At this instance, the indication means may indicate information showing a time elapsed from the reproduction start and/or of the accessible period having expired, to notify the user of an extra time for accessing after the access to the content has expired.

Another preferred embodiment of the present invention provides a method of controlling recording and reproducing of content for which a accessible period is restricted. The method includes the steps of: recording the content received from an external source; determining the accessible period for the recorded content; indicating information about the accessible period for the recorded content; and reproducing the recorded content according to a relationship between a record holding period for the recorded content and a current time.

The method according to the second preferred embodiment of the invention allows indication of the information about the accessible period for the recorded content in the step of indicating information. The accessible period herein used can be determined, for example, based on a record holding period uniquely given to each subdivision of content.

Therefore, based on the information indicated by the step of indicating information, a user, i.e., a viewer or hearer of the content can acknowledge how much time remains before the accessible period for the content expires or how much time has elapsed after the accessible period has expired, and also can easily check how a system is currently working to manage his or her recording of information whose usable time is limited.

In one implementation, the accessible time (period) to the content can be determined based on a time within a record holding period given to the content and starting when distribution of the content is initiated or as starting at a time when reception, or recording by the step of recording the content, of the content is initiated. In another implementation, the accessible period for the content may be determined based on a time within a record holding period given to the content and starting time when the content is reproduced for a first time by the step of reproducing the recorded content.

In the step of indicating information, the information about the accessible period for the recorded content may be indicated by superposing with a reproduced signal of the content. Thus, the viewer or hearer of the content can check the remaining time over the screen on which the content is being reproduced. Alternatively, in the step of indicating information, the information about the accessible period for the recorded content may be indicated via an output apparatus other than the channel for outputting of the reproduced content. Still alternatively, in the step of indicating information, the information about the accessible period for the recorded content may be sent to a communication path such as a network, to give notice about the remaining time to an external equipment or apparatus or device.

Furthermore, in the method according to the second preferred embodiment of the invention, operation of reproducing the content may be switched according to commands entered by a user.

For example, in response to a command for shifting an access start position from a user, i.e., a viewer or hearer of the content, a reproducing position for the content may be shifted, and in the step of indicating information, the information about the accessible period for the reproduced content may be indicated. In this way, the user, i.e., the viewer or hearer of the content can acknowledge the remaining accessible period or the time elapsed since the expiration of the accessible period, and also can easily check how a system is currently working for management of his or her recording of information having accessible time restricted.

In addition, in response to a command from a user for deactivating a pause function, in the step of indicating information, the information about the accessible period for the content can be indicated, and an instruction may be given to start reproducing the content if the access to the content is not yet expired.

Since the reproduction control means prohibits reproduction of content to which accessible time has expired in the step of reproducing the recorded content, for protection of rights over the content such as copyrights, the user can no longer access the content having its access expired. Thus, for the content to which accessible time has expired, there is no need to keep the content under pause. Hence, upon expiration of the accessible period for the content under pause, the step of reproducing the recorded content, the content under pause may be automatically started irrespective of whether or not a user has given a command for resuming accessing of the content under pause, so that the user may not fail to access the content carelessly. At this instance, in the step of indicating information, the information may be indicated as to a time elapsed from the reproduction start and/or as to the accessible period having run out, to notify the user of an extra time for accessing after the content has become overdue or expired.

Another preferred embodiment of the present invention provides a storage medium for recording a software program in computer readable form for controlling recording and reproducing of content to which an accessible time is restricted. The software program includes the steps of: recording the content received from an external source; determining the accessible period for the recorded content; indicating information about the accessible period for the recorded content; and reproducing the recorded content according to a relationship between a record holding period for the recorded content and a current time.

The storage medium according to such preferred embodiment of the invention may include, for example, media that provide computer software in a computer-readable form for general-purpose computers capable of executing several program codes. These media may include CDs (Compact Disc—a trademark), Flexible Discs (FDs) and Magneto-Optical Discs (MOs), which are detachable and flexible. It would also be technically feasible to provide a specific computer system with computer software via transmission media including a communication network (whether wired or not).

The storage medium defines a structural or functional cooperative relationship between specific computer software and the storage medium in order to accomplish functions of the specific computer software on a computer system. In other words, by installing the specific computer software to the computer system via the storage medium according to the third preferred embodiment of the invention mentioned above, cooperative operation is implemented on the computer system, to attain advantages similar to those provided by the content recording/reproducing apparatus and method according to the first and second preferred embodiments of the invention mentioned above.

A fourth preferred embodiment of the present invention provides a computer program, which is written such that control over recording and reproducing of content for which an accessible period is restricted can be executed on a computer system. The computer program includes the steps of: recording the content received from an external source; determining the accessible period for the recorded content; indicating information about the accessible period for the recorded content; and reproducing the recorded content according to a relationship between a record holding period for the recorded content and a current time.

The computer program according to the fourth preferred embodiment of the invention defines a computer program written in such a computer-readable manner that a computer system can execute predetermined processing. In other words, by installing to a computer system the computer software according to the fourth preferred embodiment of the invention, cooperative operation is accomplished on the computer system, to attain advantages similar to those attained by the content recording/reproducing apparatus and method according to the first and second preferred embodiments of the invention mentioned above.

As described above, according to the preferred embodiments of the present invention, it is possible to provide a content recording/reproducing apparatus, method, storage medium and computer program for conveniently record and reproduce a content having restrictions regarding recording holding time or reproduction time (period), such restrictions imposed in order to protect copyrights and the like.

In addition, according to the preferred embodiments of the present invention, it is possible to provide a content recording/reproducing apparatus, method, storage medium and computer program that permits conveniently informing a user of a mechanism of time limitation regarding access to provided content.

Furthermore, the content recording/reproducing apparatus and method thereof according to the preferred embodiments of the present invention permit indicate a relation between an imposed limitation and a current time, when such limitation exists for the recording holding time period regarding certain information such as broadcasted content, which have such limitation as a protection of copyrights and the like. As a result, the user can be acknowledged of the remaining time until expiration of such time limit or, alternatively, take notice of the amount of time that has elapsed since expiration of the time limit for access to the content, thus being able to understand the operation of the recording process of information or content having time limits regarding access thereto. Moreover, through making reproduction start immediately upon expiration of the time limit, it is possible to prevent inadvertent loss of access to the provided content.

BRIEF DESCRIPTION OF THE DRAWINGS

The above and other features and advantages of the present invention will become more apparent from the following description of the presently exemplary preferred embodiments of the present invention taken in conjunction with the accompanying drawings, in which.

DESCRIPTION OF THE PREFERRED EMBODIMENTS

Preferred embodiments of the present invention will be described in detail below, with reference to the attached drawings.

Figure 1:
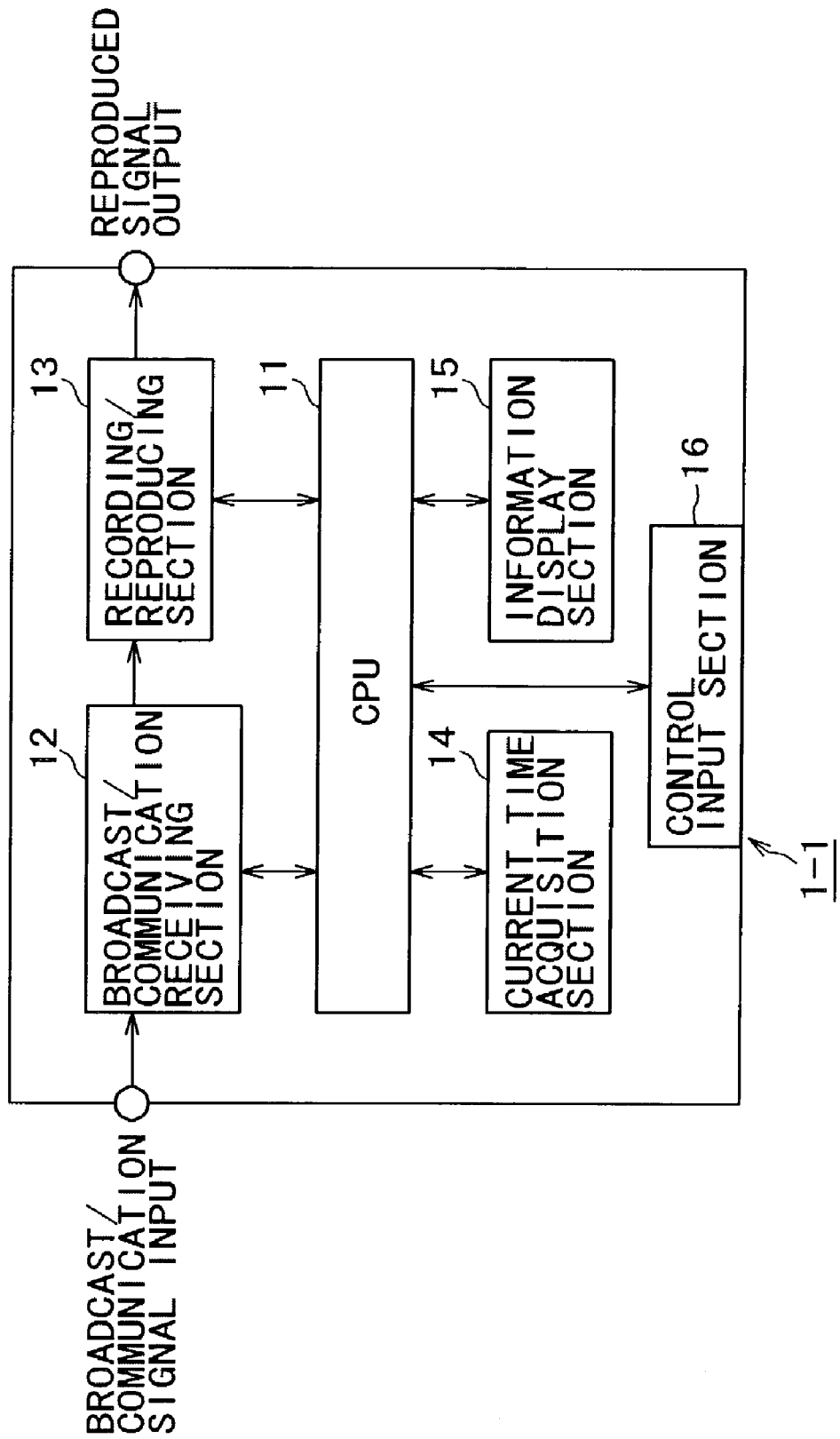
FIG. 1 is a diagram schematically showing a functional configuration of a content recording/reproducing apparatus 1-1 according to a preferred embodiment of the present invention.

FIG. 1 schematically shows a functional configuration of a content recording/reproducing apparatus 1-1 according to a preferred embodiment of the present invention. The content recording/reproducing apparatus 1-1 records push distribution type content, such as broadcasted content, to allow a user to access the recorded content at some later time. It has to be noted that "access", "accessing" and the like in the present specification includes the meaning of accessing or having access not only to visual content such as accessing image content but also to audio and visual content, such as watching audio/video content, listening to audio content, etc., so that the word should be construed in the widest meaning it may convey. In the following description, it is presupposed that the content recording/reproducing apparatus 1-1 is constantly recording content, and can set a content reading pointer to a particular position by activating a pause function and read the content from a particular position in the memory by deactivating this pause function.

The content recording/reproducing apparatus 1-1 according to the present embodiment receives content distributed via communication media such as broadcasting waves and networks, records the received content under a time limit requirement, i.e., a record holding period or a reproducible period, and can also indicate a relationship between the required time limit and a current time. Referring now to FIG. 1, functions performed by various parts of the apparatus 1-1 will be described below.

Central Processing Unit (CPU) 11 is a main controller that totally controls operations of the content recording/reproducing apparatus 1-1 by executing various control programs under an execution environment provide through an operating system (OS).

Broadcast/communication receiving section 12 receives broadcast content via, for example, an antenna (or a cable), or receives content distributed from servers via a network (e.g., a wide area network such as the Internet and the like). The received content is supplied to recording/reproducing section 13.

The recording/reproducing section 13 is constituted by, for example, a hard disk device (not shown) having a large storage capacity of several tens of gigabytes or more, and a disk interface that controls access to the hard disk, such as writing and reading data to and from the hard disk.

When the content recording/reproducing apparatus 1-1 receives, for example, content via broadcasting waves, the broadcast/communication receiving section 12 selects a predetermined channel, receives broadcast content from the selected channel, and generates streams of Moving Picture Experts Group (MPEG) data, as instructed by the CPU 11. The generated MPEG data is delivered to the recording/reproducing section 13 to be stored into the hard disk and the like.

In addition, when the apparatus 1-1 reproduces content, the recording/reproducing section 13 decodes MPEG data read from a storage such as the hard disk to generate video and audio signals therefrom. Then the video signals are subject to a predetermined video signal processing for output to a display (not shown). Moreover, the audio signals are subject to a predetermined audio signal process for output to speakers (not shown) as an audio signal.

As a matter of course, it is not necessarily required to constantly record broadcast content. When receiving broadcast content for direct accessing, the recording/reproducing section 13 may skip recording the content, and directly decode MPEG data streams to externally output the decoded video and audio signals on the display and to the speakers.

In addition, although the example shown in FIG. 1 shows a structure that has the display and speakers for image output and audio output of content as external devices to be connected, the concept of the present invention is not to be limited to such structure, thus the recording/reproducing apparatus 1-1 may have the display as well as the speakers and the like incorporated to the apparatus 1-1 itself.

In the present preferred embodiment, the recording/reproducing section 13 records/reproduces content according to instructions from the CPU 11. For example, according to a content recording or reproducing instruction from the CPU 11, the recording/reproducing section 13 accesses a predetermined area in the hard disk to write or read data. In addition, in response to a content protecting instruction from the CPU 11, the recording/reproducing section 13 deletes from the hard disk any content for which a record holding period has expired, or does not read from the hard disk any content for which a reproducible period has expired.

Control input section 16 is a functional module for receiving commands from a user for input to the content recording/reproducing apparatus 1-1. For example, the section 16 is constituted by a control panel and a remote control that accepts user commands including turning a power supply of the apparatus 1-1 on/off, selecting a broadcasting station, record/pause/forward/rewind of the content.

Current time acquisition section 14 is another functional module for supplying the content recording/reproducing apparatus 1-1 with a current time, and can be, for example, a typical real-time clock (RTC) capable of measuring a real time (or an absolute time for measuring a accessible period for the content).

The CPU 11 receives the current time from the current time acquisition section 14 to calculate, for each subdivision of content stored in the recording/reproducing section 13, a relationship between its record holding period or reproducible period and the current time.

In addition, the CPU 11 further performs predetermined operation control within the content recording/reproducing apparatus 1-1 based on a accessible time (period) to the content.

The accessible period is herein defined as a time period during which a user is permitted to reproduce recorded content for accessing. In the present preferred embodiment, the accessible period is determined based on a record holding period uniquely given for each item of content. The accessible period is, for example, a remaining time before the relevant record holding period expires. The remaining time may be managed in terms of an absolute time limit using a time/date and a calendar clock, or in terms of a relative time limit using a recording time or a reproducing time as a reference, for example. It is to be noted that each subdivision of content is given a record holding period unique to itself. Content distributors may give each item of their content a record holding period specified according to its commercial or cultural value.

Some examples of operation control based on the accessible period include content reproduction control and display control over information about the accessible period for recorded content.

The former content reproduction control involves limiting reproduction of content operations performed by the recording/reproducing section 13. More specifically, the CPU 11 instructs the section 13 to delete from the hard disk any content having its accessible time expired or prohibits the section 13 from reading from the hard disk any such content. That is, it is prohibited to reproduce or access any content whose accessible period has run out, in order to protect rights over the content, such as copyrights.

In addition, the latter display control over information about the accessible period for recorded content means externally outputting such information as the remaining time available to view the content, for example. As a method for determining the remaining time may be, for example, calculation based on a time within a recording holding period given to the content and starting when distribution or reception/recording of the content is initiated, or as starting at a time when reproduction of the content is initiated for the first time (to be described later).

In the present preferred embodiment, after calculation of the remaining accessible time for recorded content, the CPU 11 externally outputs the calculated result via an information display section 15 to give notice to a user image-wise and/or audio-wise. The notice reminds the user of how long he or she can access the content before the accessible period runs out or how long it has passed after the accessible period has run out. The information display section 15 includes dedicated equipment for external output, such as a liquid crystal display panel and speakers, which is provided on the content recording/reproducing apparatus 1-1 not for use in accessing content.

Figure 2:
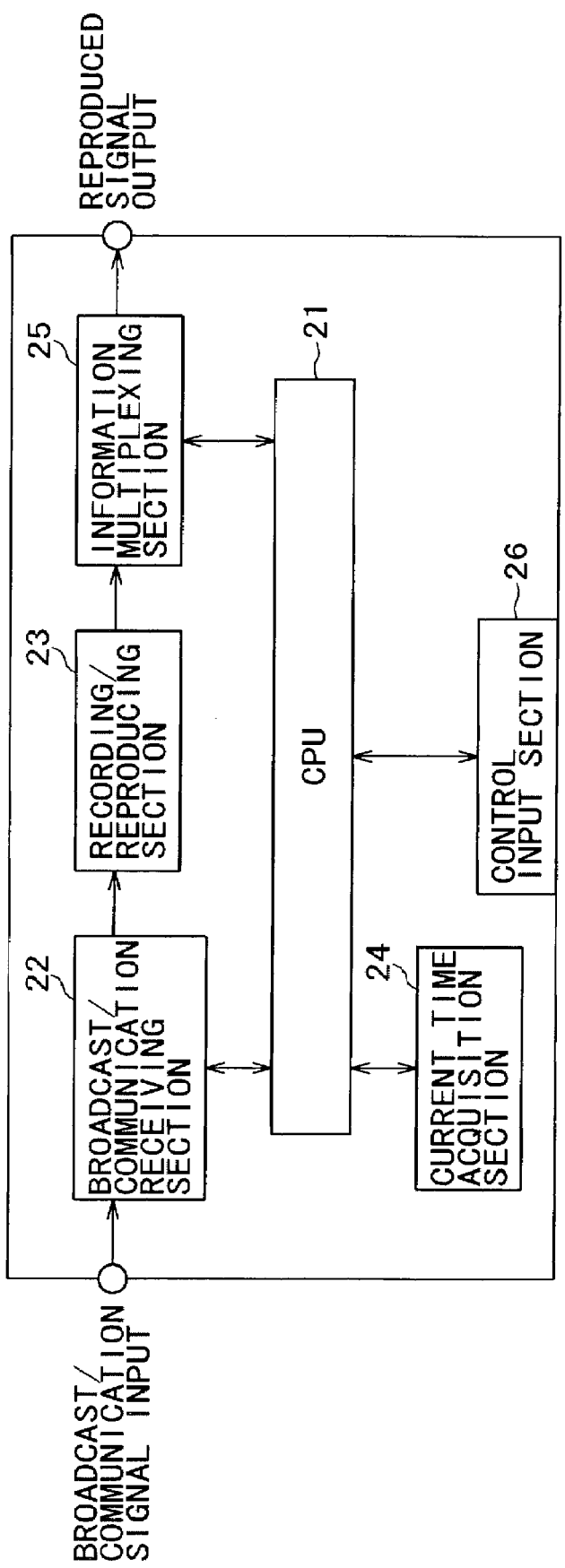
FIG. 2 is a diagram schematically showing a functional configuration of a content recording/reproducing apparatus 1-2 according to another preferred embodiment of the present invention.

In addition, FIG. 2 schematically shows a functional configuration of a content recording/reproducing apparatus 1-2 according to another embodiment of the present invention.

It is assumed that the content recording/reproducing apparatus 1-2 is constantly recording content, and can set a content reading pointer to a particular position by biasing the pause function and read the content from the particular position in memory by releasing this pause function (same as above).

In addition, the content recording/reproducing apparatus 1-2 according to the present preferred embodiment receives content distributed via communication media such as broadcasting waves and networks, records the received content with a time limit, or a accessible period imposed, and can also indicate a relationship between the imposed time limit and a current time. Referring then to the same FIG. 2, functions performed by various parts of the apparatus 1-2 will be described below.

CPU 21 is a main controller that totally controls operations of the content recording/reproducing apparatus 1-2 by executing assorted control programs under an operating system (OS).

Broadcast/communication receiving section 22 receives broadcast content via an antenna, for example, or receives content downloaded via a network. The received content is supplied to a recording/reproducing section 23.

The recording/reproducing section 23 includes, for example, a hard disk drive (not shown) having a large storage capacity, and a disk interface for controlling access to the hard disk, such as writing and reading data to and from the hard disk.

When receiving content, the broadcast/communication receiving section 22 selects a predetermined channel, receives broadcast content from the selected channel, and generates MPEG data streams, as instructed by the CPU 21. The generated MPEG data is delivered to the recording/reproducing section 23 for storage into a hard disk and the like.

When reproducing content, the recording/reproducing section 23 decodes MPEG data read from a storage such as the hard disk to generate video and audio signals therefrom. The section 23 then subjects the video signals to a predetermined video signal process for output on a display (not shown), and the audio signals to a predetermined audio signal process for output to speakers (not shown) as audio signals.

Of course, it is not necessary to constantly record broadcast content, and hence, the recording/reproducing section 23 may skip content recording operation and directly decode MPEG data streams to externally output the decoded video and audio signals on the display and to the speakers. The display and speakers may be incorporated into the content recording/reproducing apparatus 1-2, instead of being external to the apparatus 1-2.

In the present preferred embodiment, the recording/reproducing section 23 records/reproduces content according to instructions from the CPU 21. For example, the section 23 accesses a predetermined area in the hard disk to write or read data according to a content recording or reproducing instruction from the CPU 21. Also, in response to a content protecting instruction from the CPU 21, the recording/reproducing section 23 restricts use of any content whose accessible period has expired. For example, the section 23 erases from the hard disk any content to which accessible time has expired (prohibition of record holding), or does not read from the hard disk any content to which accessible time has expired (prohibition of reproduction).

A control input section 26 is a functional module for receiving commands from a user for input to the content recording/reproducing apparatus 1-2. The section 26 may be, for example, a control panel and a remote control that accept user commands for turning a power supply of the apparatus 1-2 on/off, selecting a broadcasting station, recording/pause/forwarding/rewinding of content, for example.

Current time acquisition section 24 is another functional module for supplying the content recording/reproducing apparatus 1-2 with a current time, and can be, for example, a typical real-time clock (RTC) capable of measuring real time.

The CPU 21 receives current time from the current time acquisition section 24 to calculate a accessible period for each subdivision of content stored in the recording/reproducing section 23. The accessible period for the content is calculated as a remaining time based on a time within a record holding period given to the content and starting when distribution of the content begins or reception/recording of the content begins, or as starting at a time when reproduction of the content begins for the first time (same as above). In addition, the CPU 21 controls the operation of reproduction of the content and displays information about the accessible period based on the content accessible period.

The control of content reproduction is substantially the same as that performed in the first preferred embodiment, and hence its description is herein omitted.

The latter function of displaying information about a accessible period is to externally output a calculated accessible period. In the second preferred embodiment, this function is performed by an information multiplexing section 25. That is, the CPU 21 calculates a accessible period for recorded content, and then instructs the information multiplexing section 25 to display information based on the calculated result. The information multiplexing section 25 multiplexes a display signal carrying the information about the accessible period into video and/or audio signals reproduced based on data read from the recording/reproducing section 23. As a result, the information about the accessible period is outputted visually and/or audibly as superimposed upon the regular content being reproduced. As a result, the viewer or hearer can acknowledge the remaining time before the accessible period runs out or elapsed time after the accessible period has run out, while viewing an image reproduced from the recorded content.

Figure 3:
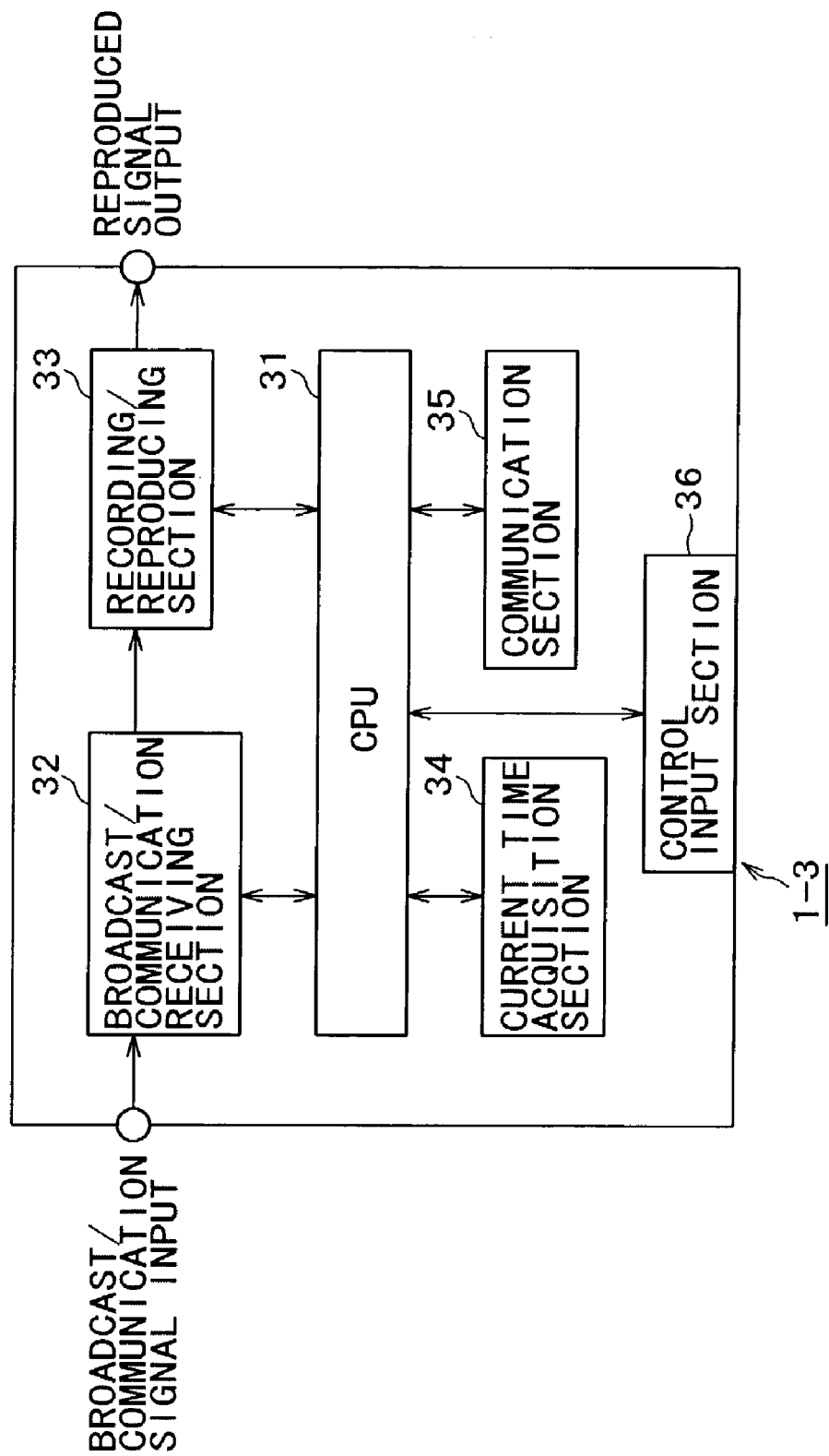
FIG. 3 is a diagram schematically showing a functional configuration of a content recording/reproducing apparatus 1-3 according to still another preferred embodiment of the present invention.

In addition, FIG. 3 schematically shows a functional configuration of a content recording/reproducing apparatus 1-3 according to still another preferred embodiment of the present invention.

It is presupposed that the content recording/reproducing apparatus 1-3 is constantly recording content, and can set a content reading pointer to a particular position by activating a pause function and read the content from the particular position in memory by deactivating this pause function (same as above).

The content recording/reproducing apparatus 1-3 receives content distributed via communication media such as broadcasting waves and networks, records the received content under a time limit requirement, i.e., a accessible period, and can further indicate a relationship between the required time limit and a current time. Referring further to FIG. 3, functions performed by various parts of the apparatus 1-3 will be described below.

A CPU 31 is a main controller that totally controls operations of the content recording/reproducing apparatus 1-3 by execution of various control programs under an operating system (OS).

A broadcast/communication receiving section 32 receives broadcast content via an antenna, for example, or receives content downloaded via a network. The received content is supplied to a recording/reproducing section 33.

The recording/reproducing section 33 includes, for example, a hard disk drive (not shown) having a large storage capacity, and a disk interface that controls access to the hard disk, such as writing and reading data to and from the hard disk.

The broadcast/communication receiving section 32 selects a predetermined channel, receives broadcast content from the selected channel, and generates MPEG data streams, as instructed by the CPU 31. The generated MPEG data is delivered to the recording/reproducing section 33 to be stored into the hard disk, etc.

When reproducing content, the recording/reproducing section 33 also decodes MPEG data read from a storage location such as the hard disk in order to generate video and audio signals therefrom. The section 33 then subjects the video signals to a predetermined video signal process for output on a display (not shown), and the audio signals to a predetermined audio signal process for output to speakers (not shown) as audio signals.

As a matter of course, it is not necessarily required to constantly record broadcast content. The recording/reproducing section 33 may skip content recording operation to implement direct decoding of MPEG data streams in order to externally output the decoded video and audio signals on the display and to the speakers. The display and speakers may be incorporated to the content recording/reproducing apparatus 1-3, instead of being externally connected to the apparatus 1-3.

In the present preferred embodiment, the recording/reproducing section 33 records/reproduces content according to instructions from the CPU 31. For example, the section 33 accesses a predetermined area in the hard disk to write or read data according to a content recording or reproducing instruction from the CPU 31. Also, responsive to a content protecting instruction from the CPU 31, the recording/reproducing section 33 limits use of any content whose accessible period has expired. For example, the section 33 deletes from the hard disk any content to which accessible time has expired (prohibition of record holding), or does not read from the hard disk any content to which accessible time has expired (prohibition of reproduction).

A control input section 36 is a functional module for input of user commands to the content recording/reproducing apparatus 1-3. The section 36 includes, for example, a control panel and a remote control that accept user commands including turning on/off a power supply of the apparatus 1-3, selecting a broadcasting station, recording/forwarding/rewinding content, and temporarily stopping accessing of content.

A current time acquisition section 34 is another functional module for supplying the content recording/reproducing apparatus 1-3 with a current time, and includes, for example, atypical real-time clock (RTC) capable of measuring a real time.

The CPU 31 receives a current time from the current time acquisition section 34 to calculate a accessible period for each subdivision of content stored in the recording/reproducing section 33. The accessible time (period) to the content is calculated as a remaining time based on a time within a record holding period given to the content and starting when distribution of the content is initiated or reception/recording of the content is initiated, or as starting at a time when reproduction of the content is initiated for the first time (same as above). In addition, the CPU 31 utilizes a accessible time (period) to the content in order to control reproduction of the content and display information about the accessible period.

Since the control over reproduction of content is substantially the same as that performed in the first preferred embodiment, description thereof is herein omitted.

The latter function of displaying a accessible period is to externally output a calculated accessible period. In the third preferred embodiment, this function is performed by a communication section 35. That is, the CPU 31 calculates a accessible period for recorded content, and sends information that is based on the calculated result to external equipment via the communication section 35. The section 35 is interconnected with the external equipment via an interface port supporting, for example, Universal Serial Bus (USB) or IEEE1394, via short-range wireless or cordless data transfer technology such as Bluetooth or IrDA (Infrared Data Association), or via a network interface such as ETHERNET (a trademark). The external equipment herein used, although not shown, can externally output image and speech, to present a viewer or hearer with information about the accessible time (period) to the content received via the communication section 35. Therefore, the viewer or hearer can be informed of remaining time before the accessible period expires or elapsed time after the accessible period expired, while accessing image reproduced from the recorded content.

Here, consideration is given to a situation in which a user accessing broadcast content via the content recording/reproducing apparatus 1 according to any of the above preferred embodiments receives a telephone call or an unexpected guest, and thus has to stop accessing the content for a while.

It is presupposed here that the content recording/reproducing apparatus 1 is constantly recording broadcast/communication content, and, at first, immediately reproduces the recorded content for access.

The user, who has to interrupt the access (viewing/watching/hearing/listening and the like), enters a command for pause or the like via the control input section 16/26/36. It is also possible that the content recording/reproducing apparatus 1 starts recording content when triggered by the command for pause or the like, instead of constantly recording the content.

When detecting that the user cannot access the content, the CPU 11/21/31 stores a reproducing position at the time of the detection. Then, when instructed through a user command for release of pause for further accessing, an instruction for starting reproduction at the position where the user stopped the accessing is sent to the recording/reproducing section 13/23/33 via the control input section 16/26/36.

In addition, the CPU 11/21/31 also verifies whether the accessible period is limited for the broadcast/communication content based on information contained in received broadcast/communication signals. If there is limitation to the accessible period, the CPU records the content in the recording/reproducing section 13/23/33 together with such information as to allow one to obtain a recording time for the content located at a particular position on a recording medium. For example, a time code may be recorded which is initialized at a current time corresponding to a time at which the recording is started. Alternatively, a time code may be recorded which is initialized at a current time corresponding to a time at which content recorded in the recording/reproducing section 13/23/33 is reproduced for the first time. The information such as the record starting time or the reproduction starting time is utilized for calculation of an accessible time or period.

In addition, once the viewer or hearer, or in other words the user, interrupts accessing the content, a remaining time during which the content is still accessible is thereafter calculated from a relationship between the recording time and a current time. Then, by externally outputting the remaining time, the user is notified that he or she can record the content under time limit requirements, and has a specific remaining accessible time. Therefore, the user can acknowledge how much time remains or is passed before or after the expiration of the accessible period, respectively, while accessing the reproduced content. It is to be noted that the way the remaining accessible time is externally outputted varies from one embodiment to another as mentioned above.

Next, a procedure will be described in which the content recording/reproducing apparatus 1 according to any of the above embodiments performs operations including recording/reproducing content and displaying a remaining record holding time.

Figure 4:
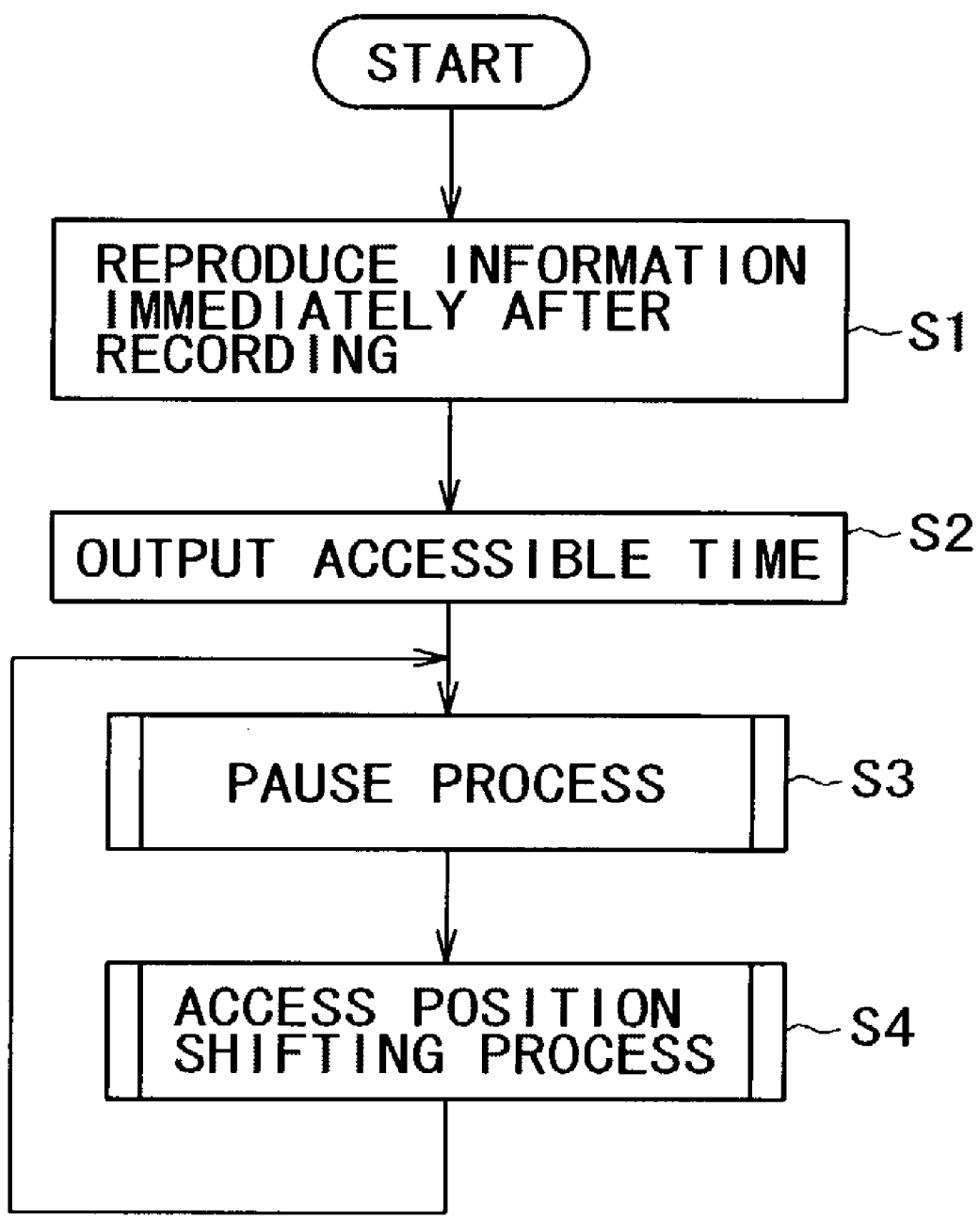
FIG. 4 is a flowchart showing a procedure for implementing content recording/reproducing operation performed by the content recording/reproducing apparatus 1, according to a preferred embodiment of the present invention.

FIG. 4 outlines in the form of a flowchart a procedure for implementing an operation of recording/reproducing content performed by the content recording/reproducing apparatus 1. This procedure is implemented by the CPU 11/21/31 executing a predetermined program code. The way content is recorded/reproduced will be described below with reference to this flowchart.

On the content recording/reproducing apparatus 1, the broadcast/communication receiving section 12/22/32 receives broadcast content by selection of a channel, and the recording/reproducing section 13/23/33 records the received content, and reproduces it, concurrently with recording, to output picture (image) and audio of the content (step S1).

While the content is being reproduced, the CPU 11/21/31 continuously acquires a current time to calculate a relationship between the accessible period for the content being reproduced and the current time, to inform the viewer or hearer of the accessible period (step S2). A method of calculation of the relationship between the accessible period and the current time is already mentioned above.

In the first preferred embodiment, the dedicated information display section 15 visually and/or audibly outputs to the viewer or hearer the remaining time during which he or she can hold the content on the storage. In the second preferred embodiment, the information multiplexing section 25 outputs the remaining time visually and/or audibly by superposition upon the regular content being reproduced. In the third preferred embodiment, the remaining time is outputted visually and/or audibly to the equipment externally connected to the apparatus 1 via the communication section 35. According to the information thus indicted, the viewer or hearer can acknowledge the remaining time for access to the content or the elapsed time since the accessible period has run out, while accessing the reproduced content.

In addition, the content recording/reproducing apparatus 1 also performs a later defined pause process (temporary access stopping) (step S3) in response to a user command or the like for pause during accessing of content, which is input via the control input section 16/26/36.

In addition, the content recording/reproducing apparatus 1 further performs another later defined access position shifting process (step S4) responsive to a user command or the like for shifting an access position (forwarding or rewinding), which is input via the control input section 16/26/36.

Hereinafter, throughout the accessing of the content, the pause process and the access position shifting process are performed in a repetitive manner.

The pause process and the access position shifting process differ in terms of how the accessible period is calculated for content. As already mentioned before, the accessible period for the content is calculated as a remaining time based on a time in which a record holding period provided to the content is elapsed starting at a time when distribution or reception/recording of the content is initiated, or as starting at a time when reproduction of the content is initiated for the first time. It should be noted that each subdivision of content is given a unique record holding period. Content distributors may also give each item of their content a record holding period specified according to its commercial or cultural value.

Figure 5:
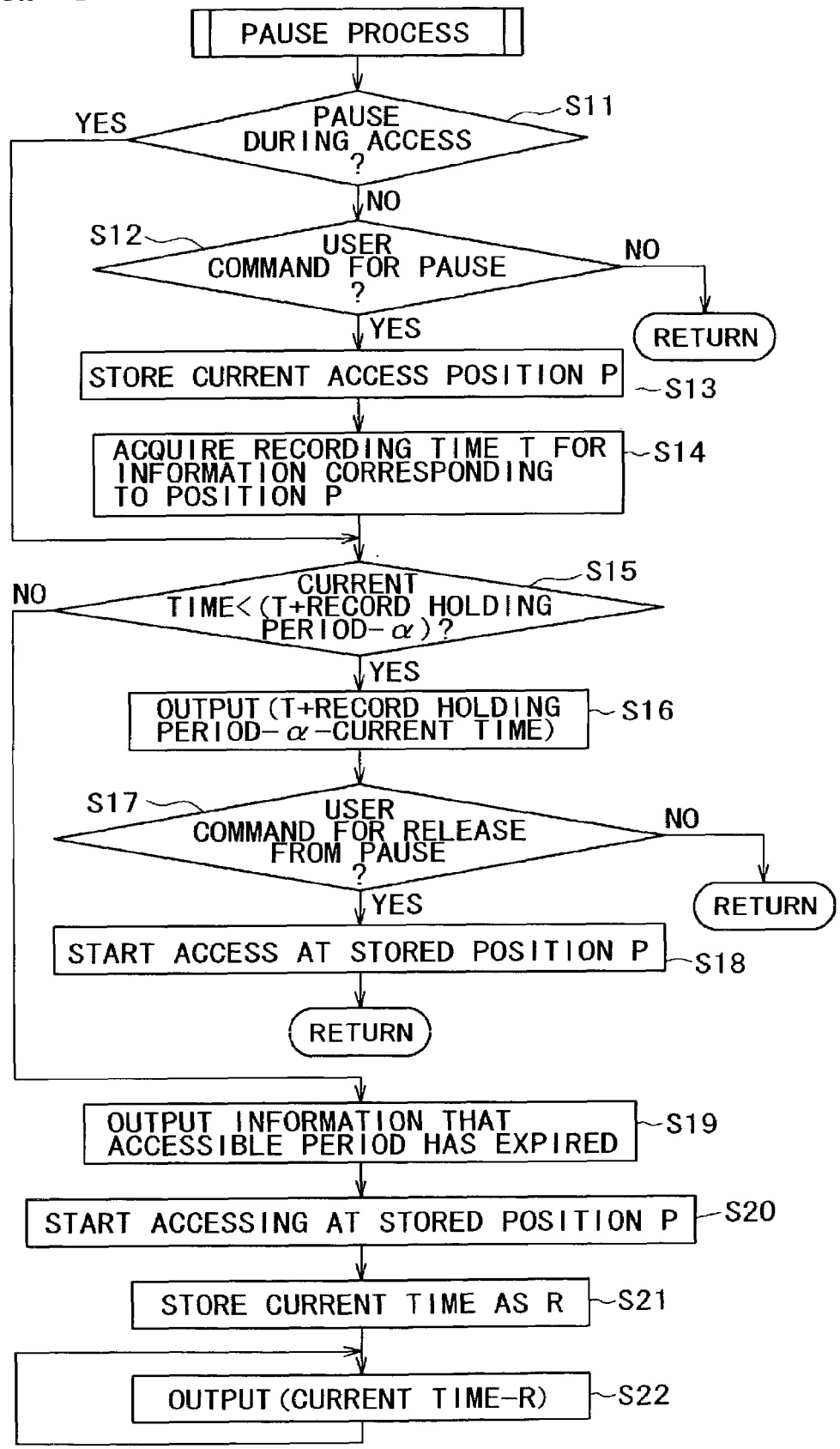
FIG. 5 is a flowchart detailing step S3 shown in FIG. 4, at which a pause process is performed.

FIG. 5 details in the form of a flowchart an example of a procedure for the pause process equivalent to step S3 in the main routine. In this example, the accessible time (period) to the content is calculated with the content recording time as a reference. Referring to this flowchart, the pause process for recorded content will be described below.

While a user is accessing content, i.e., when the pause function is not yet asserted (step S11), it is verified whether or not the pause command is received from the user via the control input section 16/26/36 (step S12). If not, the process returns to the main routine.

Upon reception of the pause command from the user, a current reproducing position P located at the recording/reproducing section 13/23/33 is temporarily stored (step S13), and a recording time T for information corresponding to the reproducing position P is acquired from the current time acquisition section 14/24/34 (step S14). It is to be noted that the recording/reproducing section 13/23/33 acquires a current time from the current time acquisition section 14/24/34 as a recording time for each unit of content (this unit of content being hereinafter referred to as "frame") when recording the unit of content, and records a current time by association with each unit of content, the unit of content serving for management of the accessible period for the content.

Next, it is verified whether or not the accessible deadline set for the content under reproduction has elapsed in relation to a constantly available current time acquired from the current time acquisition section 14/24/34 (step S15). In this example, the accessible deadline is calculated relative to the recording time for the content. Thus, at the decision block, a comparison is made between the current time and a value which is obtained by subtracting, from a sum of the recording time T given at step S14 and the record holding period unique to the content, a predetermined time a required for actually starting the reproduction, to determine whether or not the accessible deadline has arrived.

If the current time does not exceed the deadline and thus the user can hold the recorded content for further reproduction, then information about the accessible period for this non-overdue reproduced content is externally output to the user (viewer or hearer)(step S16). More specifically, the information about the accessible period means a remaining time during which the user can further reproduce the content for accessing, and is obtained by subtracting both the current time and the above predetermined time a from the sum of the recording time T acquired at step S14 and the record holding period unique to the content.

At step S16, in the first preferred embodiment, the dedicated information display section 15 informs the viewer or hearer of the remaining accessible time image-wise and/or audio-wise. In the second preferred embodiment, the information multiplexing section 25 outputs the remaining time image-wise and/or audio-wise by superposition upon the regular content being reproduced. In the third preferred embodiment, the remaining time is outputted image-wise and/or audio-wise on the externally connected equipment via the communication section 35. According to the information thus output, the user, or the viewer or hearer of the content can learn of how much time is still available or has passed before or after the expiration of the accessible period, while accessing (viewing) image reproduced from the recorded content.

Then, it is verified whether or not a user command is received via the control input section 16/26/36 for releasing from the pause function (step S17). If not, the process returns to the main routine. If so, the process starts further reproduction at the position P stored at step S13 (step S18), after which it returns to the main routine.

If, on the other hand, it is found at step S15 that the current time is beyond the accessible deadline set for the reproduced content that is not yet overdue or expired, then the user is informed that the content is overdue now (step S19). In the first preferred embodiment, the dedicated information display section 15 outputs the information that the content is overdue visually and/or audibly. In the second preferred embodiment, the information multiplexing section 25 outputs the information that the content is overdue by superposition upon the regular content being reproduced. In the third preferred embodiment, the information that the content is overdue is outputted visually and/or audibly to the externally connected equipment via the communication section 35.

Then, the process starts reproducing the content at the reproducing position P pre-stored at step S13 (step S20). Although it would not be necessary to resume the reproduction automatically with no explicit user command for release from pause or in the likelihood that the user may not be accessing the content at all, it is still arranged to do so irrespective of the user accessing the content or not, taking into account the fact that the user loses his or her right to access the content once the accessible period expires.

Then, a current time at the reproduction start is stored as a time R (step S21), and a value obtained by subtracting R from the constantly changing current time, i.e., a time interval elapsed from the start of the reproduction of the recorded content at step S20 is externally output (step S22). This elapsed time may be outputted, along with information indicating that the content is overdue. In the first preferred embodiment, the dedicated information display section 15 outputs the elapsed time visually and/or audibly. In the second preferred embodiment, the information multiplexing section 25 outputs the elapsed time visually and/or audibly by superposition upon the regular content being reproduced. In the third preferred embodiment, the elapsed time is outputted visually and/or audibly to the externally connected equipment via the communication section 35. According to the information thus indicated, the user, i.e., the viewer or hearer of the content can know about how much time has elapsed from the start of reproduction of the content since the accessible period has expired, i.e., a time interval in which the user has not (or may not have) actually accessed the content due to the expiration of the accessible period.

Figure 6:
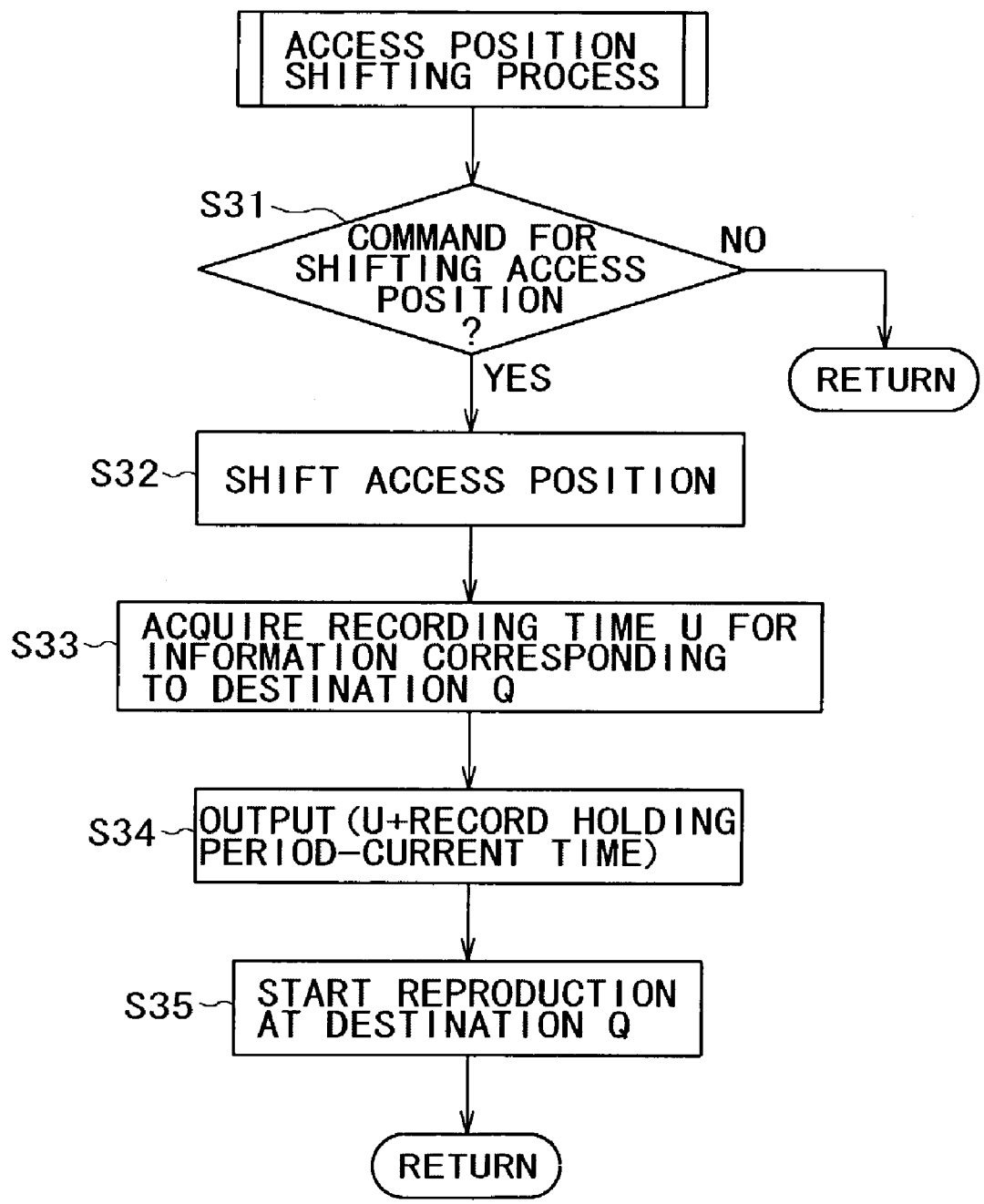
FIG. 6 is a flowchart detailing step S4 shown in FIG. 4, at which an access position shifting process is performed.

FIG. 6 shows in the form of a flowchart an example of a procedure for the access position shifting process of step S4 in the main routine, provided that, in this example, the accessible time (period) to the content is calculated with the recording time for the content as a reference. Referring to this flowchart, the process for shifting the reproducing position for content will be described below.

First, it is verified whether or not a command for shifting the access position is received from a user via the control input section 16/26/36 (step S31). The term "shifting the access position" herein used means forwarding, rewinding, or shifting a position at which to reproduce recorded content (e.g., a pointer position at which to read content from memory) according to forward/backward operation by a cursor or a jog dial.

Here, if there is no user command for shifting the access position, then the process returns to the main routine.

Otherwise, the access position of the content being reproduced is shifted according to the user command (step S32).

It should be noted, however, that the access position can be shifted only to non-expired destinations in the recorded content. For example, when the accessible time (period) to the content is managed on a frame (or a predetermined size unit) basis, the content becomes overdue in order of frames that are received/recorded the earliest, and hence the user can no longer shift the access position to any frame that has become overdue (expired)(see FIG. 7).

Next, a recording time U is acquired for a frame of content corresponding to a destination Q to which the reproducing position is shifted (step S33). Then, a relationship between an accessible period for that frame of content at the destination Q and a current time is externally output to give notice to the viewer or hearer (step S34). More specifically, the relationship between the accessible period and the current time means a remaining accessible time at the destination Q. This remaining time is obtained by subtracting the current time from the sum of the recording time U acquired at step S33 and a record holding period unique to the content at the destination Q.

In the first preferred embodiment, the dedicated information display section 15 outputs the remaining accessible time visually and/or audibly to the viewer or hearer. In the second preferred embodiment, the information multiplexing section 25 outputs the remaining time visually and/or audibly by superposition upon the regular content being reproduced. In the third preferred embodiment, the remaining time is outputted visually and/or audibly to the externally connected equipment via the communication section 35. According to the information thus indicated, the user, i.e., the viewer or hearer of the content can acknowledge how much time is still available or how much time has passed before or after the accessible deadline set for the content, respectively, while accessing image reproduced from the recorded content.

Next, the process starts reproducing the content at the destination Q (step S35), after which it returns to the main routine.

Figure 7:
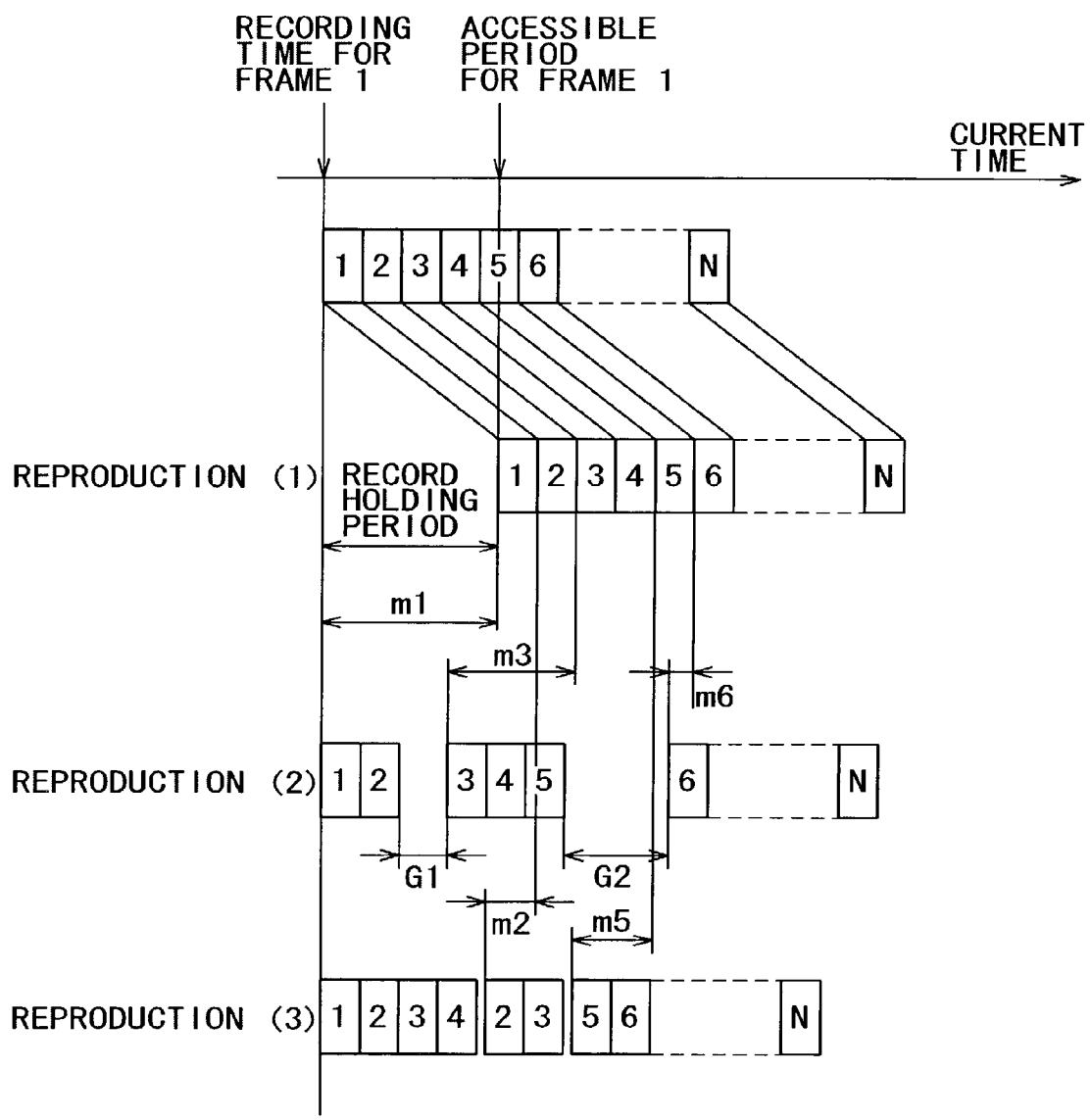
FIG. 7 is a time chart showing how a content received and recorded by the content recording/reproducing apparatus 1 is reproduced (provided that a accessible period for the content is measured from a time at which the content is received/recorded)

FIG. 7 illustrates in the form of a time chart some examples of how received and recorded content is reproduced by the content recording/reproducing apparatus 1.

Content can be divided into predetermined information units such as frames. Content is given a unique record holding period. In these examples, an equal record holding period is supposed to be given to each of frames forming an subdivision of content. Content distributors may give each item of their content a record holding period specified according to its commercial or cultural value.

Also, in the examples shown in FIG. 7, the accessible time (period) to the content is calculated based on this record holding period using the recording time for the content as a reference. That is, the accessible period for the content is obtained by subtracting a current time and a predetermined time a required for actually starting reproduction, from a sum of a recording time for a frame of the content and a record holding time unique to the content.

Any frame which is not yet expired or overdue in terms of the accessible period is reproducible. Since the accessible period is calculated based on a time elapsed from the recording or receiving time, the accessible period is consumed in order of frames that are received/recorded the earliest.

In the examples shown in FIG. 7, the content is divided into a total of N frames 1 through N, and is recorded in order of reception.

In reproduction (1), a user records received content in order of frames 1, 2, and so on, and when the accessible period runs out for the first frame 1, reproduction of the content is started at the frame 1. This operation is identical in the flowchart of FIG. 5 with the automatic reproduction starting at step S19 due to the content having been found overdue at the decision block S15.

In this example, the record holding period for the frame 1 equals m1, shown in FIG. 7. If the content is reproduced concurrently with reception/recording, then the remaining accessible time for the content equals m1, as of the time the frames 1 to N are reproduced.

In reproduction (2), the user accesses the frames 1 and 2 under concurrent recording/reproduction, pauses accessing for a time interval of G1, resumes reproduction of frames 3 to 5, pauses accessing again for a time interval G2, and then resumes reproduction at a frame 6 to access subsequent frames.

The record holding period for the frame 1 equals m1, shown in FIG. 7. If the content is reproduced upon reception/recording, then the remaining accessible time for the content equals m1, as of the time the frames 1 and 2 are reproduced.

After accessing the frame 2, the user interrupts accessing for G1, and then resumes accessing from the frame 3 and so on. The accessible period for the frame 3 at the time when the user starts accessing the frame 3 is determined by a difference between a record holding period given to the frame 3 with the recording time as a reference and a current time, and is equal to m3, in FIG. 7. Therefore, the remaining accessible time for the content equals m3, as of the time the frames 3 to 5 are reproduced.

Also, after accessing the frame 5, the user pauses accessing for G2, and then resumes reproduction from the frame 6. The accessible period for the frame 6 at the time when the user starts reproducing the frame 6 is obtained as a difference between a record holding period given to the frame 6 with the recording time for the content as a reference and a current time, which is hence equal to m6, in FIG. 7. Therefore, the remaining accessible time for the content equals m6, as of the time the frames 6 to N are reproduced.

Here, the following relation is established between the record holding period m1, initially given to the content, the time intervals G1, and G2, and the remaining time m6, given to the frame 6.

$$G1+G2+m6=m1 \qquad \text{[Equation 1]}$$

Furthermore, in reproduction (3), the user reproduces the frames 1 to 4 upon recording, thereafter shifts the reproducing position back (or rewinds) to the frame 2 to reproduce the frames 2 and 3 again, further shifts the reproducing position (or forwards) to the frame 5 to reproduce the fifth and subsequent frames.

Each recorded frame is reproducible at any time until the accessible period expires, which is calculated from a record holding period unique thereto.

In this example, reproduction or accessing of the frames 1 to 4 is started upon recording, and hence the remaining reproducible period equals m1, which corresponds to the record holding period given to the content.

Also, in this example, after having accessed (viewed) the frame 4, the user pauses accessing and rewinds to access the frames 2 and 3 again. Under this operation, the accessible period for the frames 2 and 3 is determined by a difference between a record holding period given to the frames 2 and 3 with the recording time for the content as a reference and a current time, and hence is given as m2, in FIG. 7. Therefore, the remaining time equals m2, as of the time the frames 2 and 3 are reproduced.

Furthermore in this example, after temporarily stopping (pausing) at the frame 3, the user skips the frame 4 by forwarding to reproduce the frame 5. The accessible period for the frame 5 and so on is determined by a difference between a record holding period given to the frame 5 with the recording time as a reference and a current time, and is hence given as m5, in FIG. 7. Therefore, the remaining time equals m5, as of the time the frame 5 and so on are reproduced.

In the examples shown in FIGS. 5 and 6, an accessible period is calculated using the recording time for content as a reference. On one hand, this technique is convenient for a user who starts reproducing or accessing content upon receiving/recording the content, but is not so for a user who wishes to access it whenever he or she likes after storage in the hard disk and the like, because this user may risk running out of the accessible period and thus failing to access the content, against his or her will. On the other hand, this technique is convenient for content distributors who wish to properly protect their content from unrestricted use.

In order to satisfy the needs of both the users and the content distributors, the technique can be modified as follows. That is, unless content is reproduced concurrent with reception/recording, its remaining accessible time may be calculated based on a time interval consumed in such a record holding period given to the content as starting at a time when the content is reproduced for the first time.

Figure 8:
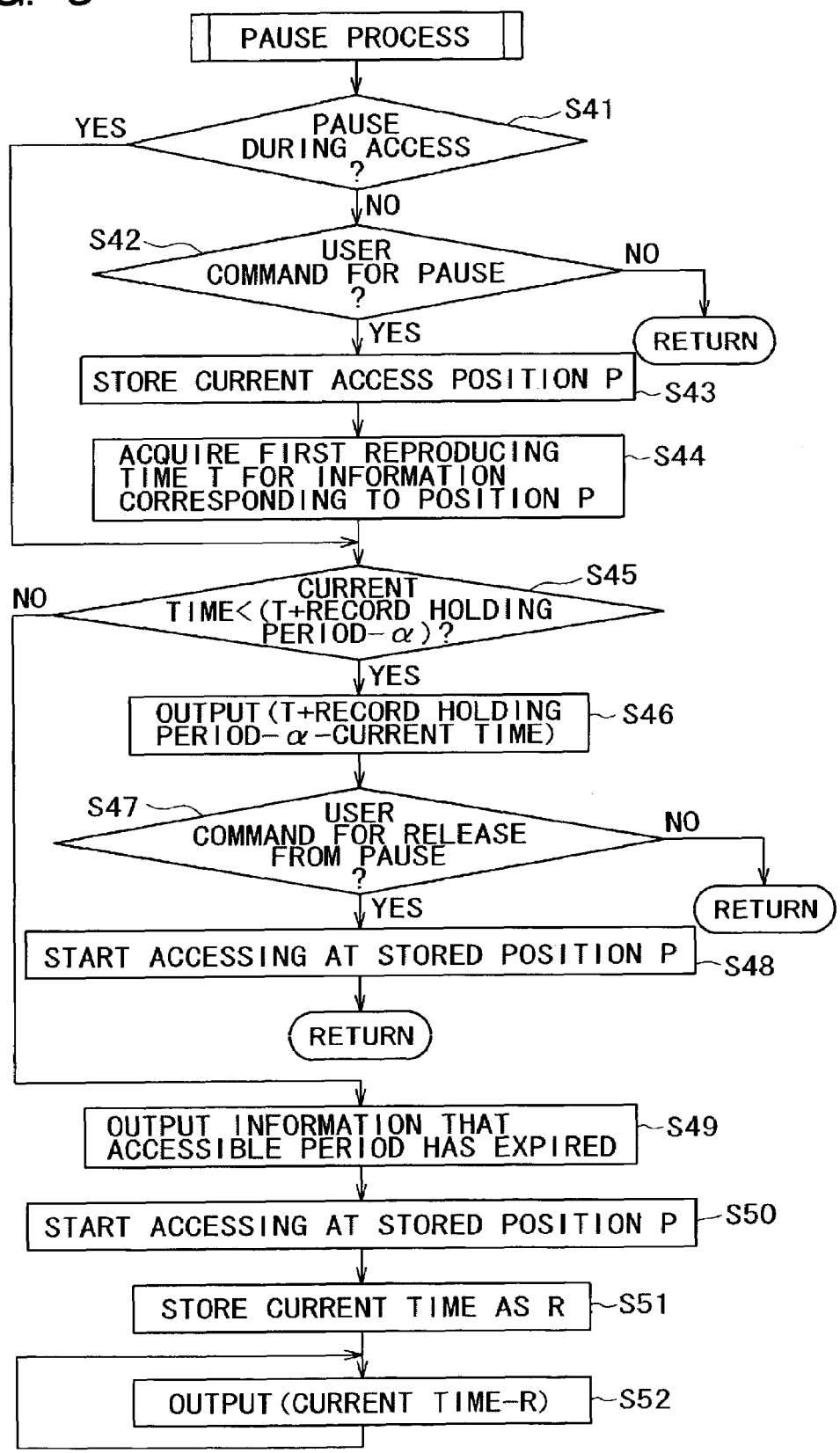
FIG. 8 is a flowchart showing a modified example of the pause process shown in FIG. 5.

FIG. 8 details in the form of a flowchart a modified example of a procedure for the pause process shown in FIG. 5, provided that, in this example, the accessible time (period) to the content is calculated with a first reproducing time for the content as a reference. Referring to this flowchart, the pause process for recorded content will be described below.

During access, i.e., when the pause function is not activated (step S41), it is verified whether or not the pause command is received from a user via the control input section 16/26/36 (step S42). If not, the process returns to the main routine.

Upon reception of the pause command from the user, a current reproducing position P located at the recording/reproducing section 13/23/33 is temporarily stored (step S43), and a time T at which the current reproducing position P is reproduced for the first time (first reproducing time T) is acquired from the current time acquisition section 14/24/34 (step S44). It is to be noted that the recording/reproducing section 13/23/33 acquires a current time from the current time acquisition section 14/24/34 as a first reproducing time for each frame (unit of content) when reproducing the frame, and records the current time by association with each frame. If the recorded content has not been reproduced yet, its first reproducing time T may be specified by a copyrights holder of the content or to a default value.

Next, it is verified whether or not the accessible deadline set for the still reproducible content is elapsed in comparison to a current time acquired from the current time acquisition section 14/24/34 (step S45). In this example, the accessible deadline is calculated relative to the first reproducing time for the content. Thus, at the decision block, a comparison is made between the current time and a value obtained by subtracting, from a sum of the first reproducing time T given at step S44 and the record holding period unique to the content, a predetermined time a required for actually resuming the reproduction, to determine whether or not the accessible deadline has arrived.

If the current time is not beyond the deadline and thus the user can hold the recorded content for further reproduction, then information about the accessible period for this noncontent to which accessible time has expired is externally outputted to the viewer or hearer (step S46). More specifically, the information about the accessible period means a remaining time during which the user can further reproduce the content for accessing, and is obtained by subtracting both the current time and the above predetermined time a from the sum of the first reproducing time T acquired at step S44 and the record holding period unique to the content.

At step S46, in the first preferred embodiment, the dedicated information display section 15 supplies the viewer or hearer with video and/or audio output as to the remaining accessible time. In the second preferred embodiment, the information multiplexing section 25 outputs the remaining time visibly and/or audibly by superposition upon the regular content being reproduced. In the third preferred embodiment, the remaining time is outputted visibly and/or audibly on the externally connected equipment via the communication section 35. According to the information thus indicated, the user, i.e., the viewer or hearer of the content can acknowledge the time still available or the time that has passed before or after the expiration of the accessible period, while viewing image reproduced from the recorded content.

Then, it is verified whether or not a user command is received via the control input section 16/26/36 in order to deactivate the pause function (step S47). If not, the process returns to the main routine. If so, the process starts reproduction at the position P stored at step S43 (step S48), after which it returns to the main routine.

If, on the other hand, it is found out at step S45 that the current time is beyond the accessible deadline set for the reproduced content, which is not yet expired, then the user is informed that the content is overdue now (step S49). In the first preferred embodiment, the dedicated information display section 15 outputs the information that the content is overdue visually and/or audibly. In the second preferred embodiment, the information multiplexing section 25 outputs the information that the content is overdue visually and/or audibly by superposition upon the regular content being reproduced. In the third preferred embodiment, the information that the content is overdue is outputted visually and/or audibly to the externally connected equipment via the communication section 35.

Then, the process starts reproducing the content at the reproducing position P pre-stored at step S43 (step S50). Although there is no explicit user command for release from pause, it is still arranged to automatically start reproduction of the content independently of whether the user is accessing the content or not in view of the fact that the user loses his or her right to access the content once the accessible period expires.

Then, a current time at the reproduction start is stored as time R (step S51), and a value obtained by subtracting R from the constantly changing current time, i.e., a time interval elapsed from the start of the reproduction of the recorded content at step S50 is externally outputted (step S52). This elapsed time may be outputted together with information indicating that the content is overdue. In the first preferred embodiment, the dedicated information display section 15 outputs the elapsed time visually and/or audibly. In the second preferred embodiment, the information multiplexing section 25 outputs the elapsed time visually and/or audibly by superposition upon the regular content being reproduced. In the third preferred embodiment, the elapsed time is outputted visually and/or audibly to the externally connected equipment via the communication section 35. According to the information thus output, the user, i.e., the viewer or hearer of the content can acknowledge the time that has elapsed from the start of reproduction of the content since the accessible period has expired, i.e., a time interval in which the user has not (or may not have) actually accessed the content due to the expiration of the accessible period.

Figure 9:
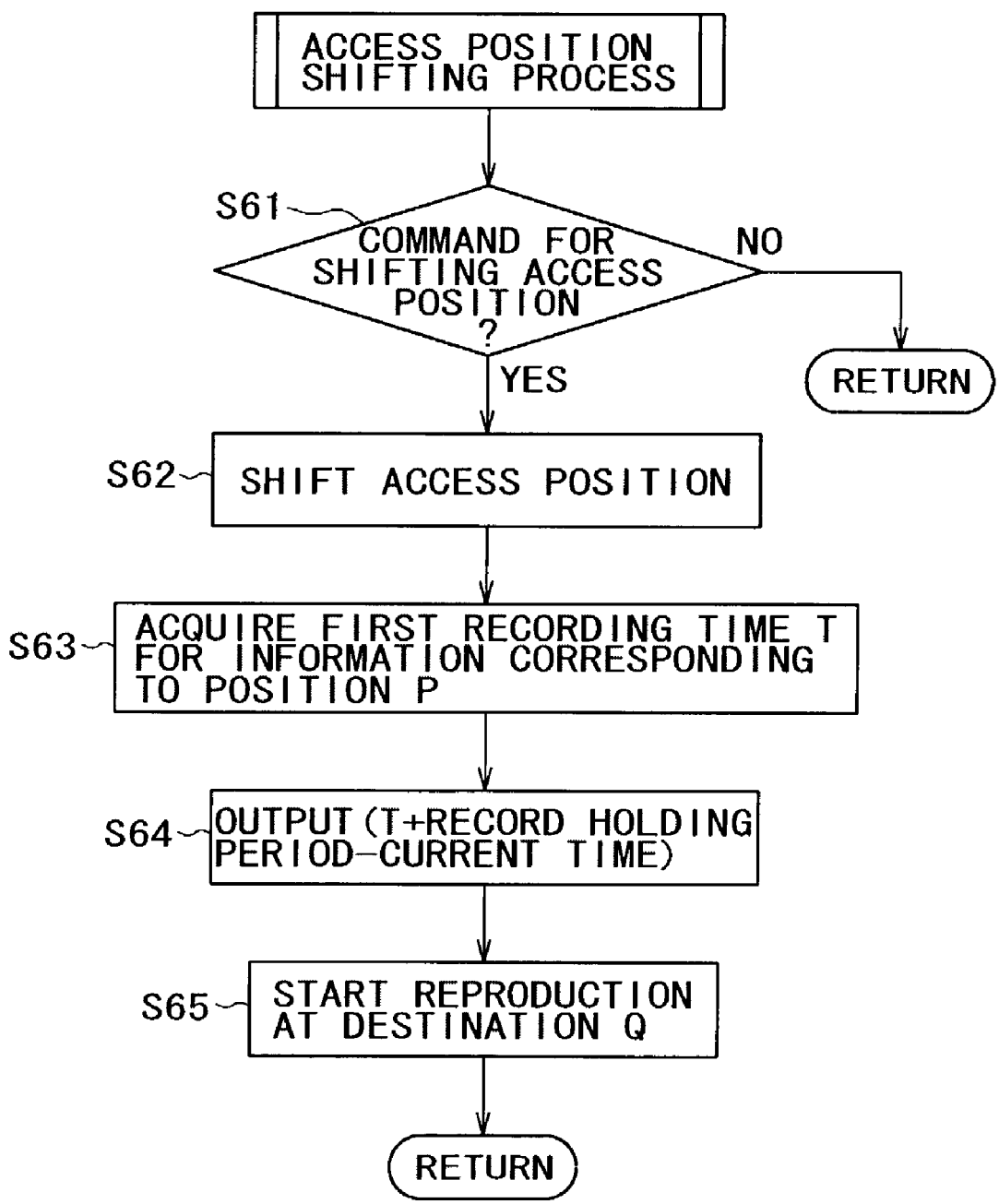
FIG. 9 is a flowchart showing a modified example of the access position shifting process shown in FIG. 6.

FIG. 9 shows in the form of a flowchart an example of variation of a procedure for the access position shifting process shown in FIG. 6. In this example, the accessible time (period) to the content is calculated with the first reproducing time for the content as a reference. Referring to this flowchart, the process for shifting the reproducing position for the content will be described below.

First, it is verified whether or not a command for shifting the access position is received from a user via the control input section 16/26/36 (step S61). The term "shifting the access position" herein used means forwarding, rewinding, or shifting a position at which to reproduce recorded content according to forward/backward operation by a cursor or a jog dial.

Here, if there is no user command for shifting the access position, then the process returns to the main routine.

Otherwise, the access position of the content being reproduced is shifted to a destination Q according to the user command (step S62).

It should be noted, however, that the access position can be shifted only to any non-overdue destination Q in the recorded content. For example, when the accessible time (period) to the content is managed on a frame (or a predetermined size unit) basis, the content becomes overdue in order of frames that are received/recorded the earliest, and hence the user can no longer move (shift) the access position to any frame that has become overdue (see FIG. 10).

Next, a recording time T is acquired for content corresponding to a current position or destination Q to which the reproducing position is shifted (step S63). Then, a relationship between an accessible period for the content at the destination Q and a current time is externally outputted to give notice to the viewer or hearer (step S64). More specifically, the relationship between the accessible period and the current time means a remaining accessible time at the destination Q. This remaining time is obtained by subtracting the current time from the sum of the first reproducing time T acquired at step S63 and a record holding period unique to the content at the destination Q.

In the first preferred embodiment, the dedicated information display section 15 visually and/or audibly outputs the remaining accessible time to the viewer or hearer. In the second preferred embodiment, the information multiplexing section 25 outputs the remaining time visually and/or audibly by superposition upon the regular content being reproduced. In the third preferred embodiment, the remaining time is outputted visually and/or audibly to the externally connected equipment via the communication section 35. According to the information thus outputted, the user, i.e., the viewer or hearer of the content can acknowledge how much time is still available or how much time is elapsed before or after the accessible deadline set for the content, respectively, while accessing image reproduced from the recorded content.

Next, the process starts reproducing the content at the destination Q (step S65), after which it returns to the main routine.

Figure 10:
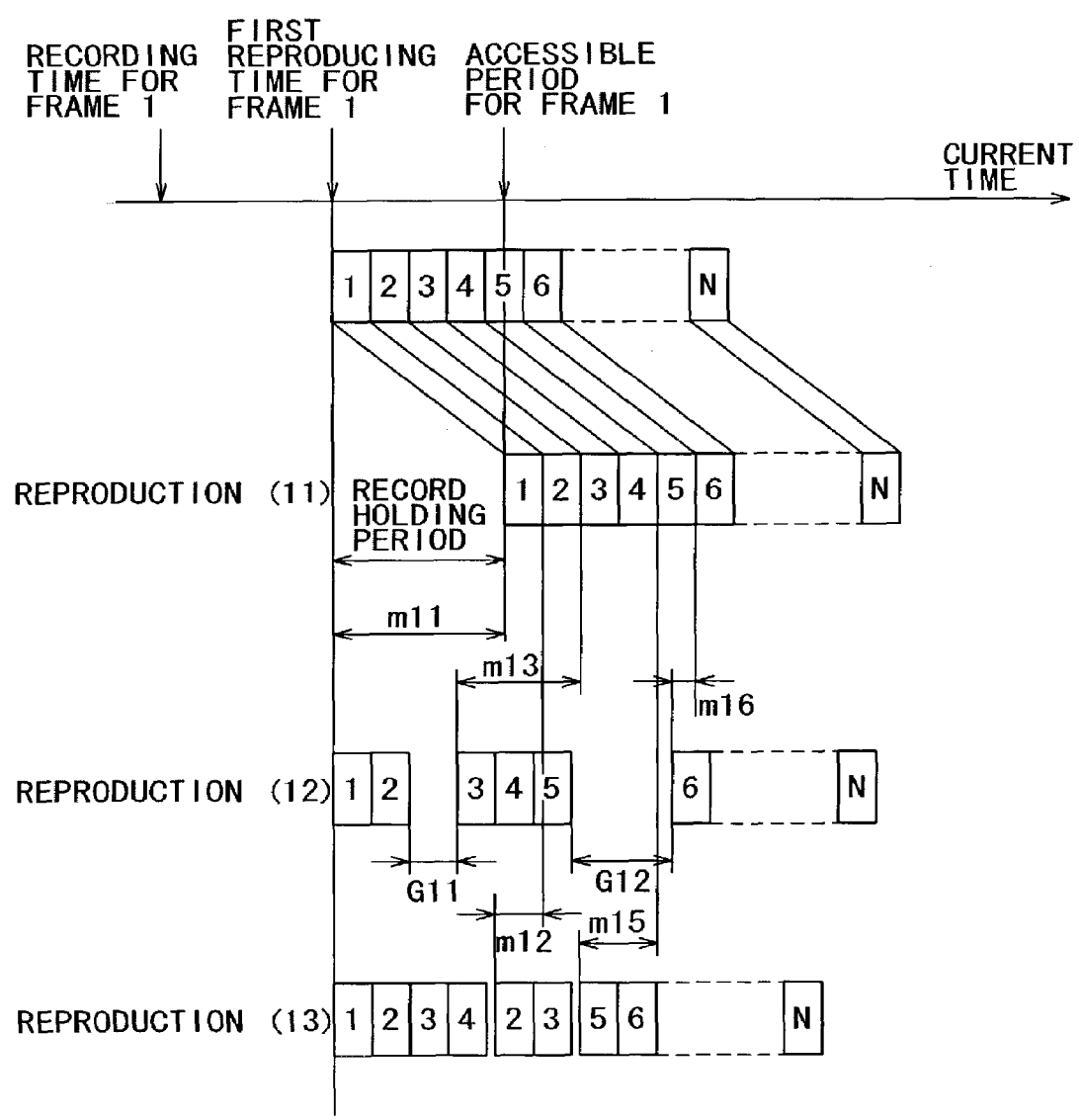
FIG. 10 is a time chart showing how a content received and recorded by the content recording/reproducing apparatus 1 is reproduced (provided that a accessible period for the content is measured from a time at which the content is reproduced for the first time).

FIG. 10 illustrates in the form of a time chart some examples of how received and recorded content is reproduced by the content recording/reproducing apparatus 1 when the accessible period is calculated based on the record holding period for the content with the first reproducing time as a reference.

The content can be divided into predetermined information units such as frames. Content is given a unique record holding period. In these examples, an equal record holding period is supposed to be given to each of frames forming an subdivision of content similar to those shown in FIG. 7. Content distributors may give each item of their content a record holding period specified according to its commercial or cultural value.

Also, when the accessible time (period) to the content is calculated relative to the first reproducing time, the accessible period for each frame is obtained by subtracting a current time and a predetermined time a required for actually starting reproduction, from a sum of a first reproducing time for the frame and a record holding time unique to the content.

Any frame which is not yet overdue in terms of the accessible period is reproducible. The accessible period is calculated based on the first reproducing time, and consumed in order of frames that are received/recorded the earliest.

In the examples shown in FIG. 10, the content is divided into a total of N frames 1 through N, and is recorded in order of reception.

In reproduction (11), a user records received content in order of frames 1, 2, and so on, and when the accessible period runs out for the first frame 1, reproduction of the content is started at the frame 1. This operation is identical in the flowchart of FIG. 8 with the automatic reproduction starting at step S49 due to the content having been found overdue at the decision block S15.

In this example, the record holding period for the frame 1 equals m11, shown in FIG. 10. Therefore, when reproduced for the first time, the frames 1 to N have their remaining accessible time equal to m11.

In reproduction (12), the user accesses the frames 1 and 2 under the first reproduction, pauses accessing for a time interval of G11, resumes reproduction of frames 3 to 5, pauses accessing again for a time interval G12, and then resumes reproduction at a frame 6 to access subsequent frames.

The record holding period for the frame 1 equals m11 shown in FIG. 10. Therefore, when reproduced for the first time, the frames 1 and 2 have their remaining time equal to m11.

After accessing the frame 2, the user interrupts accessing for G11, and then resumes accessing from the frame 3 and so on. The accessible period for the frame 3 as of the time when the user starts accessing the frame 3 is obtained as a difference between a record holding period given to the frame 3 with the first reproducing time as a reference and a current time, and is equal to m13, in FIG. 10. Therefore, the remaining accessible time for the content equals m13, as of the time the frames 3 to 5 are reproduced.

Also, after accessing the frame 5, the user pauses accessing for G12, and then resumes reproduction from the frame 6. The accessible period for the frame 6 at the time when the user starts reproducing the frame 6 is obtained as a difference between a record holding period given to the frame 6 with the first reproducing time for the content as a reference and a current time, which is hence equal to m16 in FIG. 10. Therefore, the remaining accessible time for the content equals m16, as of the time the frames 6 to N are reproduced.

Here, the following relation is established between the record holding period m11, initially given to the content, the time intervals G11, and G12, and the remaining time m16 given to the frame 6.

$$G11+G12+m16=m11 \quad\quad [\text{Eq. 2}]$$

Furthermore, in reproduction (13), the user reproduces the frames 1 to 4, thereafter shifts the reproducing position back (or rewinds) to the frame 2 to reproduce the frames 2 and 3 again, further shifts the reproducing position (or forwards) to the frame 5 to reproduce the fifth and subsequent frames.

Each recorded frame is reproducible at any time before the accessible period expires, which is calculated from a record holding period unique thereto.

In this example, the accessible period for the frames 1 to 4 that are reproduced for the first time, is equal to m11, which corresponds to a remaining period uniquely given to the content.

Also, in this example, after having accessed the frame 4, the user pauses accessing and rewinds to access the frames 2 and 3 again. Under this operation, the accessible period for the frames 2 and 3 is determined by a difference between a record holding period given to the frames 2 and 3 with the first reproducing time for the content as a reference and a current time, and hence is given as m12, in FIG. 10. Therefore, the remaining time for the content equals m12, as of the time the frames 2 and 3 are reproduced.

Furthermore in this example, after temporarily stopping at the frame 3, the user skips the frame 4 by forwarding to reproduce from the frame 5 and so on. The accessible period for the frame 5 and so on is determined by a difference between a record holding period given to the frame 5 with the first reproducing time for the content as a reference and a current time, and is hence given as m15, in FIG. 10. Therefore, the remaining time for the content equals m15, as of the time the frame 5 and so on are reproduced.

Although the present invention having been described hereinabove in its preferred form with a certain degree of particularity, other changes, variations, combinations and sub-combinations are possible therein. It is therefore to be understood that any modifications will be practiced otherwise than as specifically described herein without departing from the scope and spirit of the present invention.

What is claimed is:

1. An apparatus comprising:
    content recording means for recording content received from an external source;
    determining means for determining a time period during which a user is permitted to reproduce the content;
    indication means for indicating the time period to the user;
    content reproducing means for reproducing the content; and
    reproduction control means for limiting the reproduction of the content by the content reproducing means based on the time period during which the user is permitted to reproduce the content,
    wherein, when the time period expires while the content is paused, the reproduction control means automatically starts reproducing the content, irrespective of whether there is a command activated for resuming the reproduction of the content.

2. The apparatus according to claim 1 wherein said the time period during which the user is permitted to reproduce the content is specific to the content.

3. The apparatus according to claim 2, wherein the time period begins when distribution, reception, or recording of the content is initiated.

4. The apparatus according to claim 1, wherein the indication means indicates the time period to the user by superposing the indication of the time period the content as the content is reproduced by the content reproducing means.

5. The apparatus according to claim 1, wherein the indication means indicates the time period to the user apart from the reproduced content.

6. The apparatus according to claim 1, wherein the indication means transmits information indicating the time period to a predetermined communication path.

7. The apparatus according to claim 1, wherein the reproduction control means prohibits the content reproducing means from reproducing the content after the time period expires.

8. The apparatus according to claim 1, further comprising:
    a control input means for receiving commands from the user, wherein
    in response to a command for shifting an access start position of the content, the reproduction control means instructs the content reproducing means to shift reproduction of the content to a position within the content corresponding to the access start position, and the indication means indicates the time period to the user.

9. The apparatus according to claim 1, further comprising:
    control input means for receiving commands from the user, wherein in response to a command for resuming reproduction of the content after a pause, the reproduction control means instructs the content reproducing means to start reproducing the content unless the time period has expired, and the indication means indicates the time period to the user.

10. The apparatus according to claim 1, wherein the indication means indicates at least one of time elapsed since reproduction of the content began, and information indicating when the time period will expire.

11. A method comprising the steps implemented by a computer of:
    recording content received from an external source;
    determining, using a computer processor, a time period during which a user is permitted to reproduce the content;
    indicating the time period to the user;
    reproducing the content, wherein the reproduction of the content is limited based on the time period during which the user is permitted to reproduce the content, and
    automatically starting reproduction of the content when the time period expires while the content is paused, irrespective of whether there is a command activated for resuming the reproduction of the content.

12. The method according to claim 11, wherein the time period during which the user is permitted to reproduce the content is specific to the content.

13. The method according to claim 12, wherein
    the time period begins when distribution, reception, or recording of the content is initiated.

14. The method according to claim 11, wherein the time period is indicated to the user by superposing the indication of the time period with the content as the content is reproduced.

15. The method according to claim 11, wherein
    the time period is indicated to the user apart from the reproduced content.

16. The method according to claim 11, further comprising transmitting information indicating the time period to a predetermined communication path.

17. The method according to claim 11, wherein
    reproduction of the content is prohibited after the time period expires.

18. The method according to claim 11, further comprising, in response to a command for shifting an access start position of the content, shifting reproduction of the content to a position within the content corresponding to the access start position, and indicating the time period to the user.

19. The method according to claim 11, further comprising, in response to a command for resuming reproduction of the content after a pause, starting reproduction of the content unless the time period has expired, and indicating the time period to the user.

20. The method according to claim 11, further comprising indicating at least one of time elapsed since reproduction of the content began, and information indicating when the time period will expire.

21. A computer-readable storage medium storing a software program in computer readable form, the software program comprising the steps of:
- recording content received from an external source;
- determining a time period during which a user is permitted to reproduce the content;
- indicating the time period to the user;
- reproducing the content, wherein the reproduction of the content is limited based on the time period during which the user is permitted to reproduce the content, and
- automatically starting reproduction of the content when the time period expires while the content is paused, irrespective of whether there is a command activated for resuming the reproduction of the content.

* * * * *